(12) United States Patent
Mandava et al.

(10) Patent No.: US 12,417,042 B2
(45) Date of Patent: Sep. 16, 2025

(54) DETECTION OF DATA CORRUPTION IN MEMORY ADDRESS DECODE CIRCUITRY

(71) Applicant: Intel Corporation, Santa Clara, CA (US)

(72) Inventors: Sreenivas Mandava, Los Altos, CA (US); Jing Ling, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 17/540,847

(22) Filed: Dec. 2, 2021

(65) Prior Publication Data
US 2022/0091764 A1    Mar. 24, 2022

(51) Int. Cl.
*G06F 3/06*    (2006.01)

(52) U.S. Cl.
CPC .......... *G06F 3/0638* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60;
(Continued)

(56) References Cited

U.S. PATENT DOCUMENTS 4,481,573 A * 11/1984 Fukunaga ........... G06F 12/0833
                                                              711/E12.067
4,604,688 A *  8/1986 Tone ................... G06F 12/1475
                                                              711/E12.095
(Continued)

OTHER PUBLICATIONS

"In an SDRAM how do address rows/cols. and rank width and bank width relate to the total memory size?"; Dec. 9, 2014; retrieved from https://electronics.stackexchange.com/questions/142223/in-an-sdram-how-do-address-rows-cols. and-rank-width-and-bank-width-relate-to (Year: 2014).*

(Continued)

*Primary Examiner* — Daniel C. Chappell
(74) *Attorney, Agent, or Firm* — Compass IP Law PC

(57) ABSTRACT

A memory controller including memory address decode circuitry that detects silent data errors that occur in the memory address decode circuitry during runtime is provided. The memory address decode circuitry includes address decode circuitry to covert a received physical address to a memory address, reverse address decode circuitry to convert the memory address to a second physical address and address compare circuitry to compare the received physical address and the second physical address to detect a silent error.

20 Claims, 4 Drawing Sheets

(58) Field of Classification Search
CPC ........ G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 4,812,969 | A * | 3/1989 | Takagi | G06F 12/1036 |
| | | | | 711/209 |
| 4,926,323 | A * | 5/1990 | Baror | G06F 9/3804 |
| | | | | 712/E9.056 |
| 4,985,828 | A * | 1/1991 | Shimizu | G06F 12/1036 |
| | | | | 711/209 |
| 6,912,610 | B2 * | 6/2005 | Spencer | G06F 9/546 |
| | | | | 710/240 |
| 9,384,088 | B1 * | 7/2016 | Jones | G06F 12/1009 |
| 9,697,094 | B2 | 7/2017 | Das et al. | |
| 9,934,143 | B2 * | 4/2018 | Bains | G06F 12/0638 |
| 2004/0193808 | A1 * | 9/2004 | Spencer | G06F 12/126 |
| | | | | 711/E12.075 |
| 2006/0245264 | A1 * | 11/2006 | Barr | G06F 9/5044 |
| | | | | 714/E11.061 |
| 2006/0288177 | A1 * | 12/2006 | Shaw | G06F 11/10 |
| | | | | 711/162 |
| 2014/0089761 | A1 * | 3/2014 | Kwok | G06F 11/1048 |
| | | | | 714/768 |
| 2014/0281207 | A1 * | 9/2014 | Mandava | G11C 7/02 |
| | | | | 711/106 |
| 2016/0232063 | A1 * | 8/2016 | Das | G06F 11/108 |
| 2016/0313936 | A1 * | 10/2016 | Jones | G06F 11/1068 |
| 2018/0004597 | A1 * | 1/2018 | Kwon | G11C 29/024 |
| 2021/0013903 | A1 * | 1/2021 | Vanaparthy | H03M 13/1102 |

OTHER PUBLICATIONS

Danger Ahead: Silent Data Corruption; Argonne National Laboratory; Oct. 3, 2016; retrieved from https://www.anl.gov/mcs/article/danger-ahead-silent-data-corruption (Year: 2016).*

M. Shamsa et al., "Improved Silent Data Error Detection Through Test Optimization Using Reinforcement Learning," 2025 IEEE International Reliability Physics Symposium (IRPS), Monterey, CA, USA, 2025, pp. 8C.1-1-8C.1-5, doi: 10.1109/IRPS48204.2025.10983294. (Year: 2025).*

S. Di et al, "An Efficient Silent Data Corruption Detection Method with Error-Feedback Control and Even Sampling for HPC Applications," 2015 15th IEEE/ACM International Symposium on Cluster, Cloud and Grid Computing, Shenzhen, China, 2015, pp. 271-280, doi: 10.1109/CCGrid.2015.17. (Year: 2015).*

\* cited by examiner

DETECTION OF DATA CORRUPTION IN MEMORY ADDRESS DECODE CIRCUITRY

FIELD

This disclosure relates to data corruption in computer data and in particular to silent data corruption.

BACKGROUND

Data corruption in computer data in a computer system can occur while storing, processing or transmitting computer data between components in the computer system. Data corruption that is not detected by the computer system can be referred to as silent data corruption.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art.

Accordingly, it is intended that the claimed subject matter be viewed broadly, and be defined as set forth in the accompanying claims.

DESCRIPTION OF EMBODIMENTS

Several methods are employed in a Central Processing Unit (CPU) to protect on-die data and commands, for example, via Error Correction Code (ECC) and parity. These methods detect corruption of data in the CPU due to bit flips or defects that occur at runtime.

However, conversion of a physical address to memory address in memory address decode circuit is not protected against silent data protection resulting from defects or bit flips.

In an embodiment, silent data errors that occur in memory address decode circuitry in a memory controller during runtime are detected in the memory address decode circuitry. The memory address decode circuitry includes address decode circuitry to convert a received physical address to a memory address, reverse address decode circuitry to convert the memory address to a converted physical address and address compare circuitry to compare the received physical address and the converted physical address to detect a silent error.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
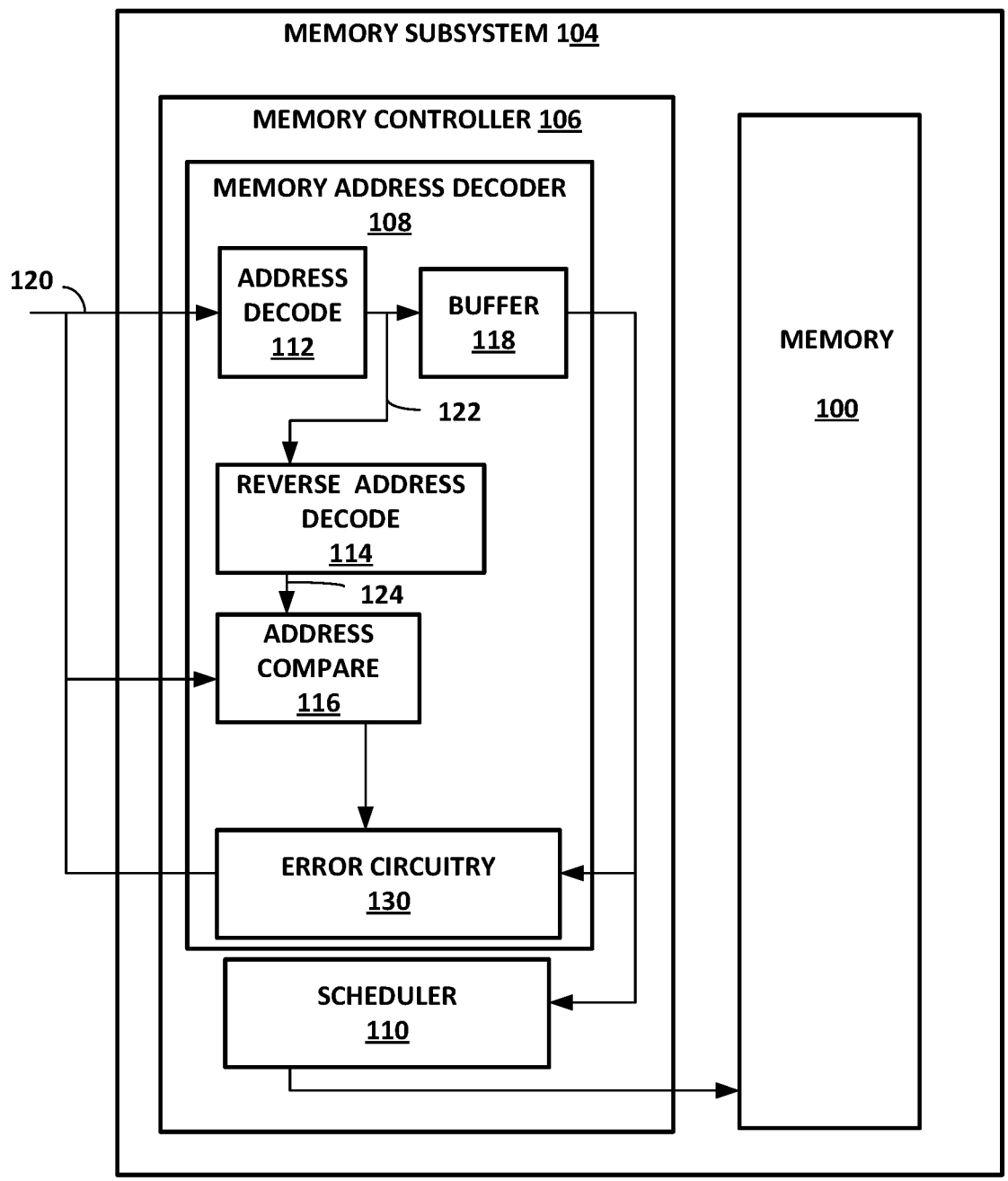
FIG. 1 is a block diagram of a memory subsystem that includes a memory and a memory controller that includes a memory address decoder to detect silent data errors in the memory address decoder.

FIG. 1 is a block diagram of a memory subsystem 104 that includes a memory 100 and a memory controller 106 that includes a memory address decoder 108 to detect silent data errors in the memory address decoder 108.

The memory 100 is a volatile memory. Volatile memory is memory whose state (and therefore the data stored on it) is indeterminate if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, Aug 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications. The JEDEC standards are available at www.jedec.org.

in an embodiment, the memory 100 is a DRAM and the memory address 122 is a DRAM address that includes a row address, column address and bank address to identify a row and column in a bank in the DRAM.

In another embodiment, the memory 100 is a nonvolatile memory. A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable, write-in-place three dimensional Crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The memory address decoder 108 includes address decode circuitry 112, reverse address decode circuitry 114, address compare circuitry 116 and error circuitry 130. In other embodiments, the error circuitry 130 can be separate from the memory address decoder 108. The address decode circuitry 112 in the memory address decoder 108 converts a received physical memory address 120 to a memory address 122. The memory address 122 is stored in buffer 118. The reverse decode circuitry 114 converts the memory address 122 to a converted physical address 124. The converted physical address 124 is used for error logging and sparing operations. Sparing operations copy the contents of memory to another location or format. Examples of sparing operations are rank sparing, where data from a bad rank is copied to a spare rank, and device sparing where contents of a bad DRAM device are copied to another DRAM device. The address compare circuitry 116 compares the received physical memory address 120 and the converted physical address 124. If there is no error, the DRAM address 122 stored in buffer 118 is forwarded to scheduler 110.

A mismatch between the received physical memory address 120 and the converted physical address 124 indicates that an error occurred in the address decode circuitry 112 and/or the reverse address decode circuitry 114. The error can be due to a defect in the address decode circuitry 112 and/or the reverse address decode circuitry 114 or a bit flip (a data bit changes from logic '1' to logic '0' or from logic '0' to logic '1').

The error could be due to a transient error in the address decode circuitry 112 and/or the reverse decode circuitry 114. If there is an error, error circuitry 130 forwards the memory address 122 stored in buffer 118 to the address decode circuitry 112 to re-perform the decode and reverse decode operation. If the first error detected was a transient error and there is no error after the decode and reverse decode operations are re-performed, the memory address 122 stored in buffer 118 is forwarded to scheduler 110. If an error is detected after the decode and reverse decode operations are re-performed one or more times, the error circuitry 130 reports a fatal memory error.

A similar scheme can be implemented in other circuitry in the CPU where address decoder functions reside such as such as Home Agents that maintain coherent memory.

Figure 2:
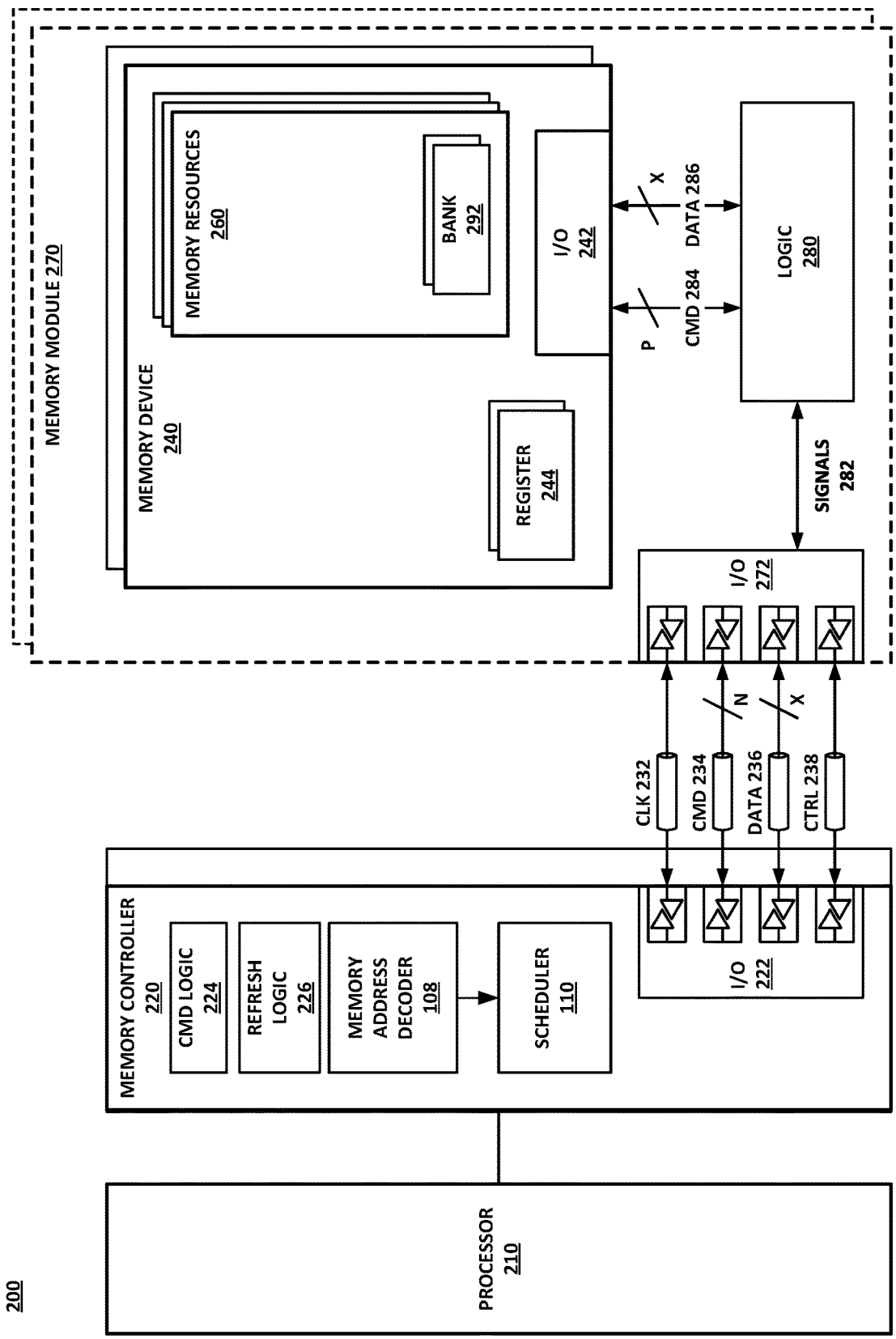
FIG. 2 is a block diagram of an embodiment of a system with a memory subsystem including at least one memory module coupled to a memory controller.

FIG. 2 is a block diagram of an embodiment of a system 200 with a memory subsystem including at least one memory module 270 coupled to a memory controller 220. The memory controller 220 includes memory address decoder 108 and scheduler 110 discussed in conjunction with FIG. 1. System 200 includes a processor 210 and elements of a memory subsystem in a computing device. Processor 210 represents a processing unit of a computing platform that can execute an operating system (OS) and applications, which can collectively be referred to as the host or user of the memory. The OS and applications execute operations that result in memory accesses. Processor 210 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or storage controller. Such devices can be integrated with the processor in some systems (for example, in a System-on-Chip (SoC)) or attached to the processer via a bus (e.g., Peripheral Component Interconnect express (PCIe)), or a combination.

Reference to memory devices can apply to volatile memory technologies or non-volatile memory technologies. Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Memory controller 220 represents one or more memory controller circuits or devices for system 200. Memory controller 220 represents control logic that generates memory access commands in response to the execution of operations by processor 210. Memory controller 220 accesses one or more memory devices 240. Memory devices 240 can be DRAM devices in accordance with any referred to above. Memory controller 220 includes I/O interface logic 222 to couple to a memory bus. I/O interface logic 222 (as well as I/O interface logic 242 of memory device 240) can include pins, pads, connectors, signal lines, traces, or wires, or other hardware to connect the devices, or a combination of these. I/O interface logic 222 can include a hardware interface. As illustrated, I/O interface logic 222 includes at least drivers/transceivers for signal lines. Commonly, wires within an integrated circuit interface couple with a pad, pin, or connector to interface signal lines or traces or other wires between devices. I/O interface logic 222 can include drivers, receivers, transceivers, or termination, or other circuitry or combinations of circuitry to exchange signals on the signal lines between the devices.

The exchange of signals includes at least one of transmit or receive. While shown as coupling I/O interface logic 222 from memory controller 220 to I/O interface logic 242 of memory device 240, it will be understood that in an implementation of system 200 where groups of memory devices 240 are accessed in parallel, multiple memory devices can include I/O interfaces to the same interface of memory controller 220. In an implementation of system 200 including one or more memory modules 270, I/O interface logic 242 can include interface hardware of the memory module in addition to interface hardware on the memory device itself. Other memory controllers 220 can include separate interfaces to other memory devices 240.

The bus between memory controller 220 and memory devices 240 can be a double data rate (DDR) high-speed DRAM interface to transfer data that is implemented as multiple signal lines coupling memory controller 220 to memory devices 240. The bus may typically include at least clock (CLK) 232, command/address (CMD) 234, and data (write data (DQ) and read data (DQO) 236, and zero or more control signal lines 238. In one embodiment, a bus or connection between memory controller 220 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for data (write DQ and read DQ) can be referred to as a "data bus." It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 220 and memory devices 240. An example of a serial bus technology is 8B10B encoding and transmission of high-speed data with embedded clock over a single differential pair of signals in each direction.

In one embodiment, one or more of CLK 232, CMD 234, Data 236, or control 238 can be routed to memory devices 240 through logic 280. Logic 280 can be or include a register or buffer circuit. Logic 280 can reduce the loading on the interface to I/O interface 222, which allows faster signaling or reduced errors or both. The reduced loading can be because I/O interface 222 sees only the termination of one or more signals at logic 280, instead of termination of the signal lines at every one or memory devices 240 in parallel. While I/O interface logic 242 is not specifically illustrated to include drivers or transceivers, it will be understood that I/O interface logic 242 includes hardware necessary to couple to the signal lines. Additionally, for purposes of simplicity in illustrations, I/O interface logic 242 does not illustrate all signals corresponding to what is shown with respect to I/O interface 222. In one embodiment, all signals of I/O interface 222 have counterparts at I/O interface logic 242. Some or all of the signal lines interfacing I/O interface logic 242 can be provided from logic 280. In one embodiment, certain signals from I/O interface 222 do not directly couple to I/O interface logic 242, but couple through logic 280, while one or more other signals may directly couple to I/O interface logic 242 from I/O interface 222 via I/O interface 272, but without being buffered through logic 280. Signals 282 represent the signals that interface with memory devices 240 through logic 280.

It will be understood that in the example of system 200, the bus between memory controller 220 and memory devices 240 includes a subsidiary command bus CMD 234 and a subsidiary data bus 236. In one embodiment, the subsidiary data bus 236 can include bidirectional lines for read data and for write/command data. In another embodiment, the subsidiary data bus 236 can include unidirectional write signal lines for write and data from the host to memory, and can include unidirectional lines for read data from the memory device 240 to the host. In accordance with the chosen memory technology and system design, control signals 238 may accompany a bus or sub bus, such as strobe lines DQS. Based on design of system 200, or implementation if a design supports multiple implementations, the data bus can have more or less bandwidth per memory device 240. For example, the data bus can support memory devices 240 that have either a x32 interface, a x16 interface, a x8 interface, or another interface. The convention "xW," where W is an integer that refers to an interface size or width of the interface of memory device 240, which represents a number of signal lines to exchange data with memory controller 220. The number is often binary, but is not so limited. The interface size of the memory devices is a controlling factor on how many memory devices can be used concurrently in system 200 or coupled in parallel to the same signal lines. In one embodiment, high bandwidth memory devices, wide interface devices, or stacked memory configurations, or combinations, can enable wider interfaces, such as a x128 interface, a x256 interface, a x512 interface, a x1024 interface, or other data bus interface width.

Memory devices 240 represent memory resources for system 200. In one embodiment, each memory device 240 is a separate memory die. Each memory device 240 includes I/O interface logic 242, which has a bandwidth determined by the implementation of the device (e.g., x16 or x8 or some other interface bandwidth). I/O interface logic 242 enables each memory device 240 to interface with memory controller 220. I/O interface logic 242 can include a hardware interface, and can be in accordance with I/O interface logic 222 of memory controller 220, but at the memory device end. In one embodiment, multiple memory devices 240 are connected in parallel to the same command and data buses. In another embodiment, multiple memory devices 240 are connected in parallel to the same command bus, and are connected to different data buses. For example, system 200 can be configured with multiple memory devices 240 coupled in parallel, with each memory device responding to a command, and accessing memory resources 260 internal to each. For a write operation, an individual memory device 240 can write a portion of the overall data word, and for a read operation, an individual memory device 240 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word are provided or received by other memory devices in parallel.

In one embodiment, memory devices 240 can be organized into memory modules 270. In one embodiment, memory modules 270 represent dual inline memory modules (DIMMs). Memory modules 270 can include multiple memory devices 240, and the memory modules can include support for multiple separate channels to the included memory devices disposed on them.

Memory devices 240 each include memory resources 260. Memory resources 260 represent individual arrays of memory locations or storage locations for data. Typically, memory resources 260 are managed as rows of data, accessed via word line (rows) and bit line (individual bits within a row) control. Memory resources 260 can be organized as separate banks of memory. Banks may refer to arrays of memory locations within a memory device 240. In one embodiment, banks of memory are divided into sub-banks with at least a portion of shared circuitry (e.g., drivers, signal lines, control logic) for the sub-banks.

In one embodiment, memory devices 240 include one or more registers 244. Register 244 represents one or more storage devices or storage locations that provide configuration or settings for the operation of the memory device. In one embodiment, register 244 can provide a storage location for memory device 240 to store data for access by memory controller 220 as part of a control or management operation. In one embodiment, register 244 includes one or more Mode Registers. In one embodiment, register 244 includes one or more multipurpose registers. The configuration of locations within register 244 can configure memory device 240 to operate in different "mode," where command information can trigger different operations within memory device 240 based on the mode. Additionally, or in the alternative, different modes can also trigger different operation from address information or other signal lines depending on the mode. Settings of register 244 can indicate configuration for I/O settings (e.g., timing, termination, driver configuration, or other I/O settings).

Memory controller 220 includes scheduler 110, which represents logic or circuitry to generate and order transactions to send to memory device 240. From one perspective, the primary function of memory controller 220 is to schedule memory access and other transactions to memory device 240. Such scheduling can include generating the transactions themselves to implement the requests for data by processor 210 and to maintain integrity of the data (e.g., such as with commands related to refresh).

Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 220 typically includes logic to allow selection and ordering of transactions to improve performance of system 200. Thus, memory controller 220 can select which of the outstanding transactions should be sent to memory device 240 in which order, which is typically achieved with logic much more complex than a simple first-in first-out algorithm. Memory controller 220 manages the transmission of the transactions to memory device 240, and manages the timing associated with the transaction. In one embodiment, transactions have deterministic timing, which can be managed by memory controller 220 and used in determining how to schedule the transactions.

Referring again to memory controller 220, memory controller 220 includes command (CMD) logic 224, which represents logic or circuitry to generate commands to send to memory devices 240. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 240, memory controller 220 can issue commands via I/O 222 to cause memory device 240 to execute the commands. Memory controller 220 can implement compliance with standards or specifications by access scheduling and control.

Referring again to logic 280, in one embodiment, logic 280 buffers certain signals 282 from the host to memory devices 240. In one embodiment, logic 280 buffers data signal lines 236 as data 286, and buffers command (or command and address) lines of CMD 234 as CMD 284. In one embodiment, data 286 is buffered, but includes the same number of signal lines as data 236. Thus, both are illustrated as having X signal lines. In contrast, CMD 234 has fewer signal lines than CMD 284. Thus, P>N. The N signal lines of CMD 234 are operated at a data rate that is higher than the P signal lines of CMD 284. For example, P can equal 2N, and CMD 284 can be operated at a data rate of half the data rate of CMD 234.

In one embodiment, memory controller 220 includes refresh logic 226. Refresh logic 226 can be used for memory resources 260 that are volatile and need to be refreshed to retain a deterministic state. In one embodiment, refresh logic 226 indicates a location for refresh, and a type of refresh to perform. Refresh logic 226 can execute external refreshes by sending refresh commands. For example, in one embodiment, system 200 supports all bank refreshes as well as per bank refreshes. All bank refreshes cause the refreshing of a selected bank 292 within all memory devices 240 coupled in parallel. Per bank refreshes cause the refreshing of a specified bank 292 within a specified memory device 240.

System 200 can include a memory circuit, which can be or include logic 280. To the extent that the circuit is considered to be logic 280, it can refer to a circuit or component (such as one or more discrete elements, or one or more elements of a logic chip package) that buffers the command bus. To the extent the circuit is considered to include logic 280, the circuit can include the pins of packaging of the one or more components, and may include the signal lines. The memory circuit includes an interface to the N signal lines of CMD 234, which are to be operated at a first data rate. The N signal lines of CMD 234 are host-facing with respect to logic 280. The memory circuit can also include an interface to the P signal lines of CMD 284, which are to be operated at a second data rate lower than the first data rate. The P signal lines of CMD 284 are memory-facing with respect to logic 280. Logic 280 can either be considered to be the control logic that receives the command signals and provides them to the memory devices, or can include control logic within it (e.g., its processing elements or logic core) that receive the command signals and provide them to the memory devices.

Figure 3:
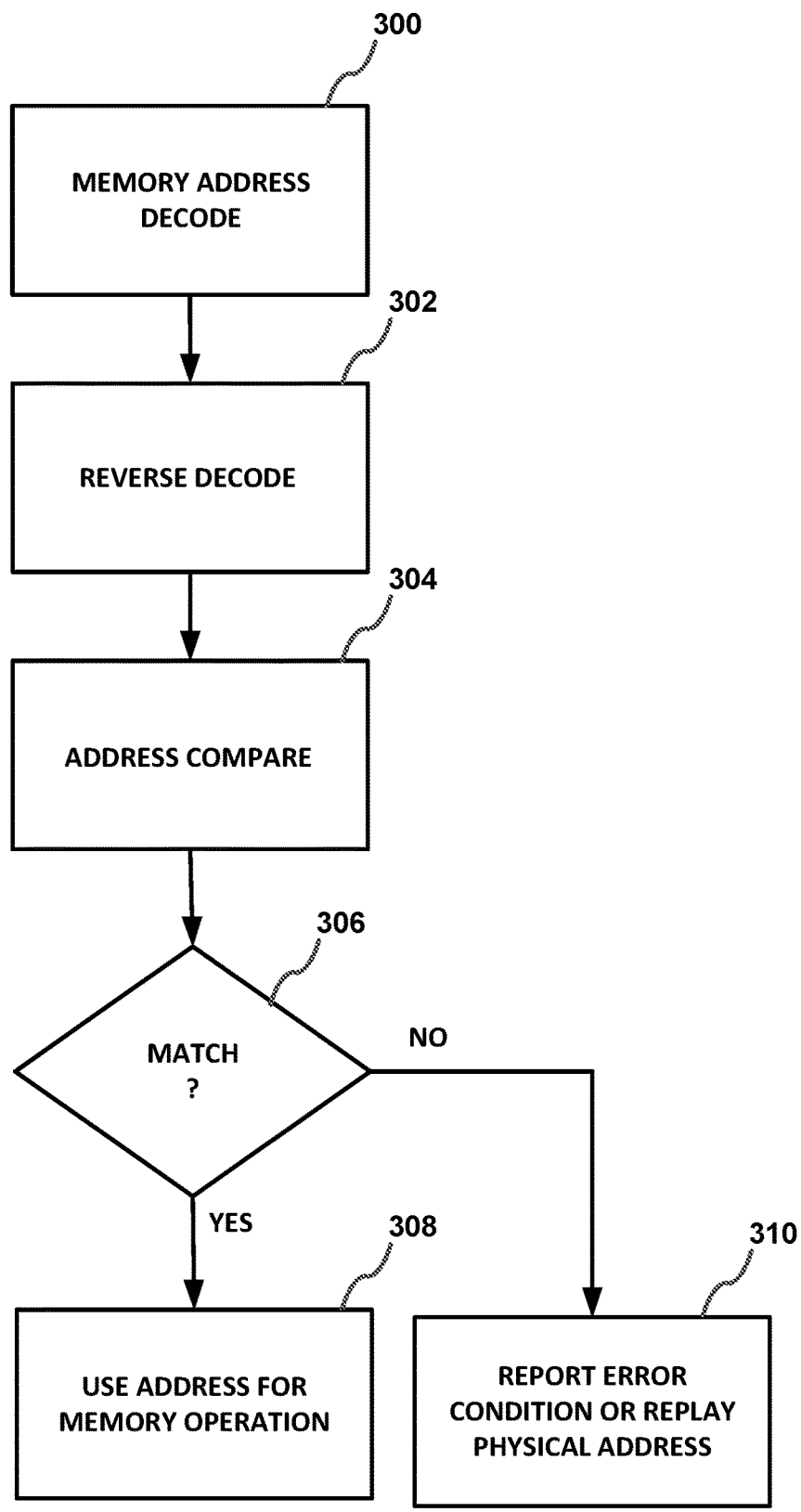
FIG. 3 is a method performed in the memory address decoder in the memory controller to detect data corruption in the memory address decoder in FIG. I.

FIG. 3 is a method performed in the memory address decoder 108 in the memory controller 106 to detect data corruption in the memory address decoder 108 in FIG. 1.

At block 300, address decode circuitry 112 converts the received physical memory address 120 of a transaction issued to the memory controller 106 and converts it to a memory address 122. Processing continues with block 302.

At block 302, before the memory address 122 is used for memory operations in memory 100, it is converted to the converted physical address 124 in the reverse decode circuitry 114. Processing continues with block 304.

At block 304, the converted physical address 124 that is output from the reverse decode circuitry 114 is compared in address compare circuitry 116 with the received physical memory Address 120 of the transaction received by the memory controller 106. Processing continues with block 306.

At block 306, if the converted physical address 124 and the received physical memory Address 120 match. Processing continues with block 308. If the if the converted physical address 124 and the received physical memory Address 120 do not match, processing continues with block 310.

At block 308, the converted physical address 124 and the received physical memory address 120 are the same indicating that data corruption did not occur in the address circuitry 112 and the reverse address decode circuitry 114. The received physical memory address 120 can be forwarded to the scheduler 110 for use in the memory 100.

At block 310, the converted physical address 124 and the received physical memory address 120 do not match indicating that data corruption occurred in the address circuitry 112 and/or in the reverse address decode circuitry 114. A mismatch indicates a corruption in the address decode circuitry 112 and/or the reverse address decode circuitry 114. The mismatch can be managed by either blocking the transaction and flagging an error or replaying the transaction by re-issuing the received physical memory address 120 stored in buffer 118 to the address decode circuitry 112.

Figure 4:
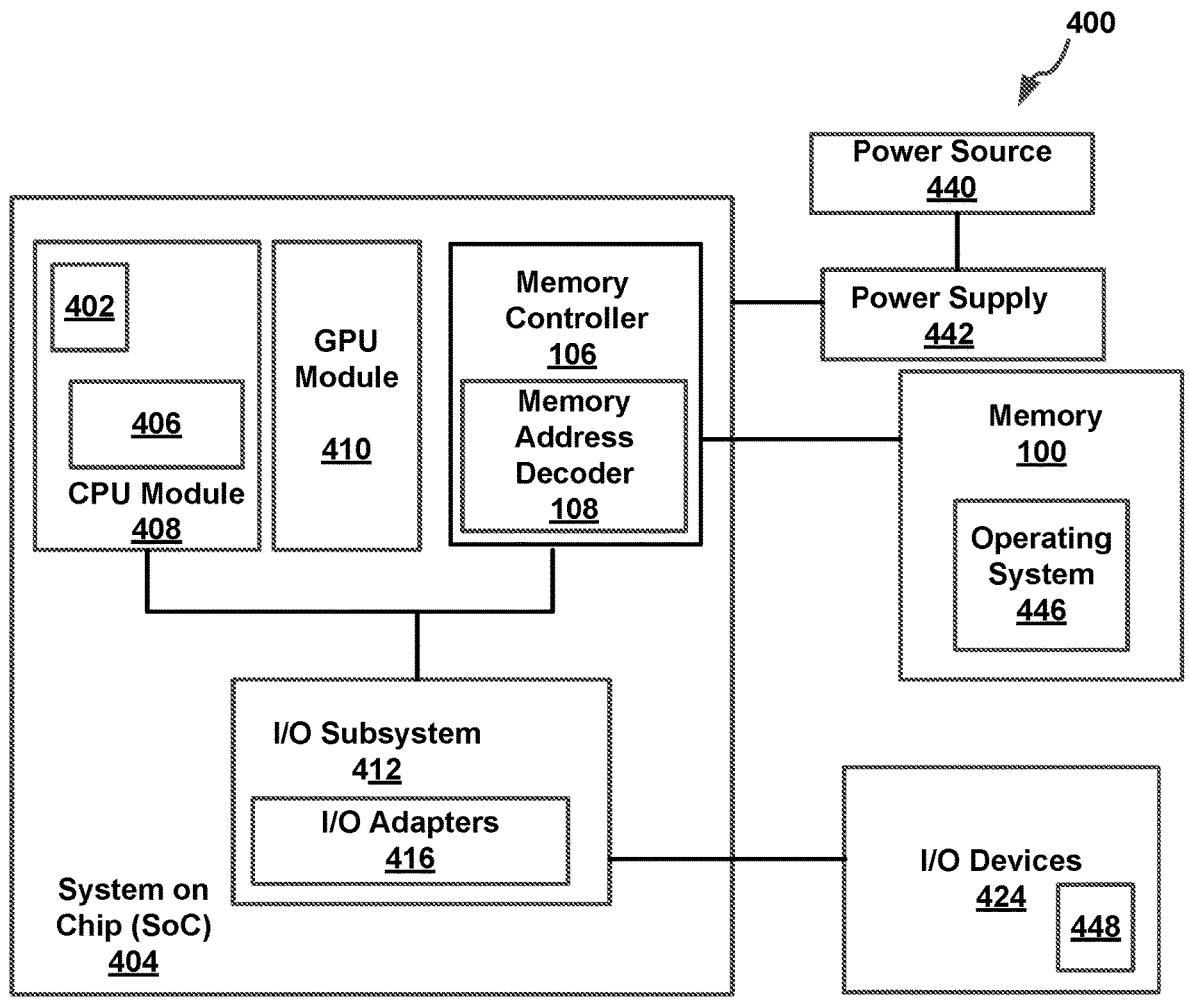
FIG. 4 is a block diagram of an embodiment of a computer system that includes the memory address decoder.

FIG. 4 is a block diagram of an embodiment of a computer system 400 that includes the memory address decoder 108. Computer system 400 can correspond to a computing device including, but not limited to, a server, a workstation computer, a desktop computer, a laptop computer, and/or a tablet computer.

The computer system 400 includes a system on chip (SOC or SoC) 404 which combines processor, graphics, memory, and Input/Output (I/O) control logic into one SoC package. The SoC 404 includes at least one Central Processing Unit (CPU) module 408, memory controller 106, and a Graphics Processor Unit (GPU) 410. In other embodiments, the memory controller 106 can be external to the SoC 404. The CPU module 408 includes at least one processor core 402 and a level 2 (L2) cache 406. The memory controller 106 is communicatively coupled to memory 100.

Although not shown, each of the processor core(s) 402 can internally include one or more instruction/data caches, execution units, prefetch buffers, instruction queues, branch address calculation units, instruction decoders, floating point units, retirement units, etc. The CPU module 408 can correspond to a single core or a multi-core general purpose processor, such as those provided by Intel® Corporation, according to one embodiment.

The Graphics Processor Unit (GPU) 410 can include one or more GPU cores and a GPU cache which can store graphics related data for the GPU core. The GPU core can internally include one or more execution units and one or more instruction and data caches. Additionally, the Graphics Processor Unit (GPU) 410 can contain other graphics logic units that are not shown in FIG. 4, such as one or more vertex processing units, rasterization units, media processing units, and codecs.

Within the I/O subsystem 412, one or more I/O adapter(s) 416 are present to translate a host communication protocol utilized within the processor core(s) 402 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 416 can communicate with external I/O devices 424 which can include, for example, user interface device(s) including a display and/or a touch-screen display 448, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Memory 100 can store an operating system 446. The operating system 446 is software that manages computer hardware and software including memory allocation and access to I/O devices. Examples of operating systems include Microsoft® Windows®, Linux®, iOS® and Android®.

Power source 440 provides power to the components of system 400. More specifically, power source 440 typically interfaces to one or multiple power supplies 442 in system 400 to provide power to the components of system 400. In one example, power supply 442 includes an AC to DC (alternating current to direct current) adapter to plug into a wall outlet. Such AC power can be renewable energy (e.g., solar power) power source 440. In one example, power source 440 includes a DC power source, such as an external AC to DC converter. In one example, power source 440 or power supply 442 includes wireless charging hardware to charge via proximity to a charging field. In one example, power source 440 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A memory controller comprising:
   memory address decode circuitry, the memory address decode circuitry including:
   address decode circuitry to convert a received physical address to a memory address;
   reverse address decode circuitry to receive the memory address from the address decode circuitry and to convert the memory address to a second physical address; and
   address compare circuitry to compare the received physical address and the second physical address, the received physical address to be forwarded to a scheduler in the memory controller for use by a memory if the received physical address and the second physical address match.

2. The memory controller of claim 1, wherein if the received physical address and the second physical address do not match, the memory controller to block a transaction to use the received physical address and to flag an error.

3. The memory controller of claim 1, if the received physical address and the second physical address are not the same, the memory controller to replay a transaction using the received physical address.

4. The memory controller of claim 1, wherein the memory controller to detect silent data errors that occur in the address decode circuitry or reverse address decode circuitry during runtime.

5. The memory controller of claim 1, wherein the memory is a volatile memory.

6. The memory controller of claim 5, wherein the volatile memory is a Dynamic Random Access Memory.

7. The memory controller of claim 6, wherein the memory address includes a row address, a column address and a bank address.

8. A method performed by a memory controller comprising:
   converting, in address decode circuitry, a received physical address to a memory address;
   converting, in reverse address decode circuitry, the memory address to a second physical address;
   comparing, in address compare circuitry, the received physical address and the second physical address; and
   forwarding the received physical address to a scheduler in the memory controller for use by a memory if the received physical address and the second physical address match.

9. The method of claim 8, wherein if the received physical address and the second physical address do not match, the memory controller to block a transaction to use the received physical address and to flag an error.

10. The method of claim 8, if the received physical address and the second physical address are not the same, the memory controller to replay a transaction using the received physical address.

11. The method of claim 8, wherein the memory controller to detect silent data errors that occur in the address decode circuitry or reverse address decode circuitry during runtime.

12. The method of claim 8, wherein the memory is a Dynamic Random Access Memory.

13. The method of claim 12, wherein the memory address includes a row address, a column address and a bank address.

14. A system comprising:
   a processor, and
   a memory controller communicatively coupled to the processor, the memory controller comprising:
   memory address decode circuitry, the memory address decode circuitry including:
   address decode circuitry to convert a received physical address to a memory address;
   reverse address decode circuitry to receive the memory address from the address decode circuitry and to convert the memory address to a second physical address; and
   address compare circuitry to compare the received physical address and the second physical address, the received physical address to be forwarded to a scheduler in the memory controller for use by a memory if the received physical address and the second physical address match.

15. The system of claim 14, wherein if the received physical address and the second physical address do not match, the memory controller to block a transaction to use the received physical address and to flag an error.

16. The system of claim 14, if the received physical address and the second physical address are not the same, the memory controller to replay a transaction using the received physical address.

17. The system of claim 14, wherein the memory controller to detect silent data errors that occur in the address decode circuitry or reverse address decode circuitry during runtime.

18. The system of claim 14, wherein the memory is a Dynamic Random Access Memory.

19. The system of claim 18, wherein the memory address includes a row address, a column address and a bank address.

20. The system of claim 14, further comprising one or more of:
   a display communicatively coupled to the processor; or
   a battery coupled to the processor.

* * * * *